United States Patent
Khakhalev et al.

(10) Patent No.: US 9,180,548 B2
(45) Date of Patent: Nov. 10, 2015

(54) METHOD FOR ONE-SIDED, ONE STEP JOINING OF A METAL SHEET STACK

(75) Inventors: Alexander D. Khakhalev, Troy, MI (US); Sanjay M. Shah, Troy, MI (US); Charles J. Bruggemann, Rochester Hills, MI (US); Daniel C. Hutchinson, Goodrich, MI (US); Joseph M. Lendway, IV, Dryden, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1714 days.

(21) Appl. No.: 12/134,252

(22) Filed: Jun. 6, 2008

(65) Prior Publication Data

US 2009/0302017 A1 Dec. 10, 2009

(51) Int. Cl.
*B23K 11/14* (2006.01)
*B23K 11/11* (2006.01)

(52) U.S. Cl.
CPC .............. *B23K 11/11* (2013.01); *B23K 11/14* (2013.01)

(58) Field of Classification Search
CPC .................................. B23K 11/14; B23K 11/20
USPC ............ 219/55, 81, 82, 83, 85.1, 85.22, 86.1, 219/80, 87, 90, 31.2, 92, 93, 117.1, 137 R; 428/594
See application file for complete search history.

(56) References Cited

U.S. PATENT DOCUMENTS

| | | | |
|---|---|---|---|
| 3,629,544 A | 12/1971 | Becker | |
| 4,427,869 A * | 1/1984 | Kimura et al. | 219/93 |
| 6,455,801 B1 * | 9/2002 | Bramervaer | 219/93 |
| 2009/0208772 A1 | 8/2009 | Khakhalev | |

FOREIGN PATENT DOCUMENTS

| | | |
|---|---|---|
| DE | 182318 U | 5/1964 |
| DE | 102007063432 A1 | 6/2009 |
| JP | 8-10962 A | 1/1996 |

OTHER PUBLICATIONS

Machine Translation of DE1892318.*
German Office Action dated Nov. 17, 2010 in German application 102009023792.5-34, corresponding to U.S. Appl. No. 12/134,252.
U.S. Appl. No. 12/033,432, filed Feb. 19, 2008, entitled Method of Welding Three Metal Sheets and Apparatus with Three Stacked Metal Sheets, Alexander D. Khakhalev, inventor.

* cited by examiner

*Primary Examiner* — Brian Jennison

(57) ABSTRACT

A joining operation for a stack of three metal sheets performed using only a single welding step, with access to only one sheet side being required. An inner sheet of the stack has formed therein a pair of bifurcated projections, wherein at least one first apex faces in one direction and at least one second apex faces in the opposite direction. First and second outer metal sheets are assembled with the inner sheet, wherein the first outer sheet abuts the at least one first apex, and the second outer sheet abuts the at least one second apex. A projection welding apparatus welds the sheets, using only access to the first outer sheet superposed the bifurcated projections, wherein a majority of the current flows through the second outer sheet.

5 Claims, 4 Drawing Sheets

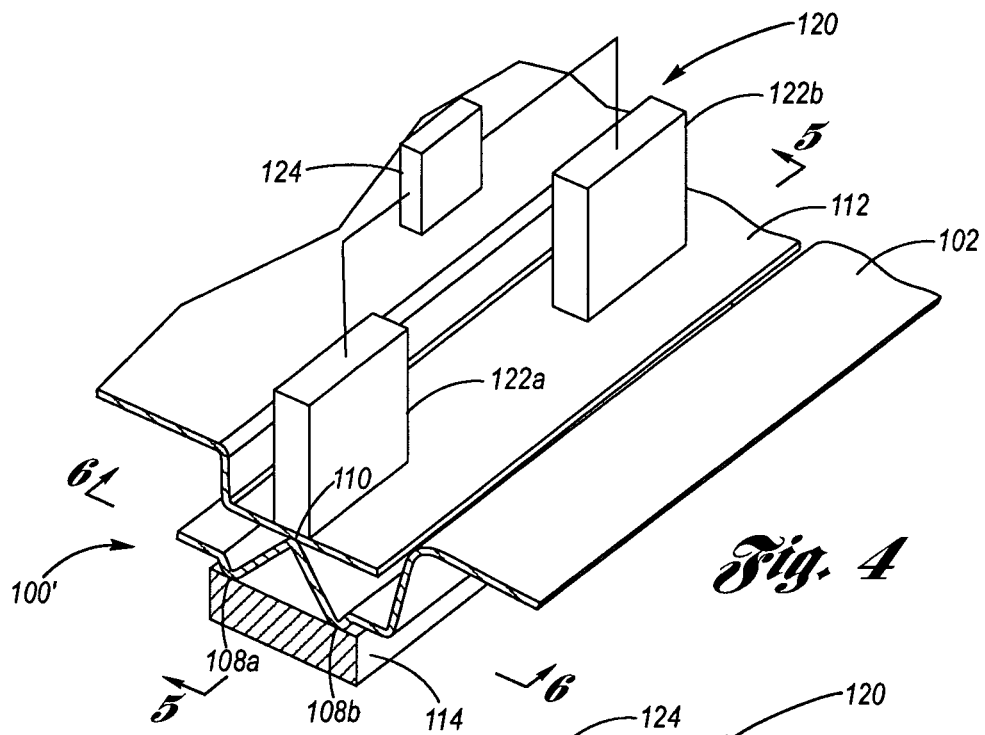
*Fig. 4*
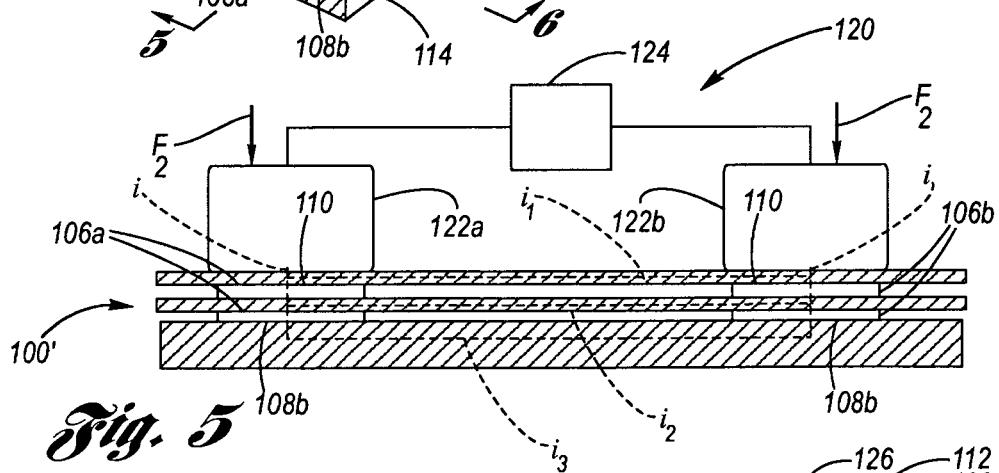
*Fig. 5*
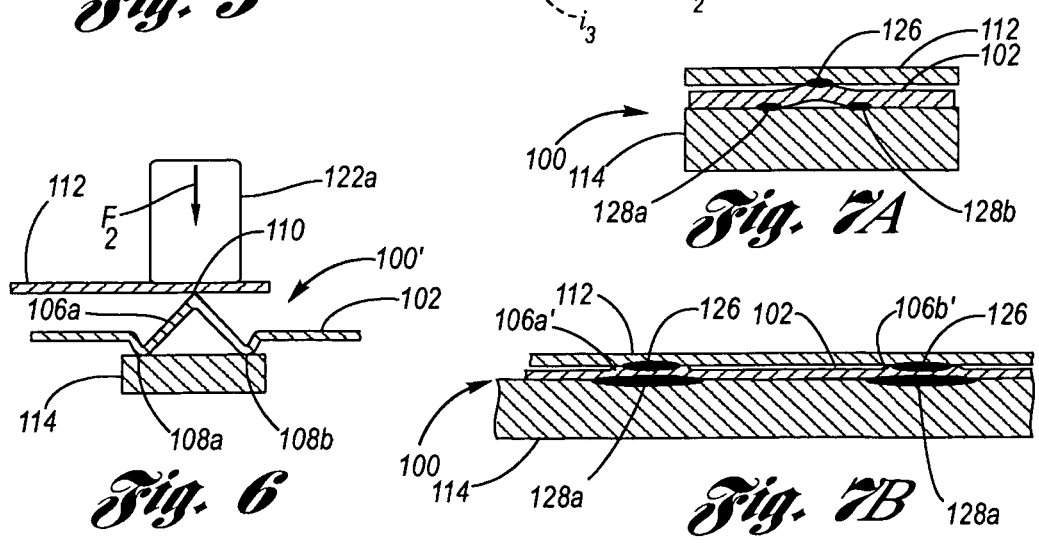
*Fig. 6*
*Fig. 7A*
*Fig. 7B*

METHOD FOR ONE-SIDED, ONE STEP JOINING OF A METAL SHEET STACK

TECHNICAL FIELD

The present invention relates to welding operations for joining together metal sheet stacks, and more particularly to a single-sided, single-step joining operation of a three sheet stack.

BACKGROUND OF THE INVENTION

The joining together of three metal sheets is known in the prior art to require two separate welding steps and require two-sided access thereto: a resistance welding step of an inner sheet with an outer sheet, which requires access to opposite sides of the sheets to permit joining thereof by the welding electrodes, followed by a projection welding step of the inner sheet with another outer sheet.

FIG. 1 shows an example of a joined sheet metal stack 10, composed of a first outer sheet 12, an inner sheet 14, and a second outer sheet 16, in the form of a metal strap which is considerably thicker in relation to the first and second sheets. The second outer sheet 16 is joined to the inner sheet 14 by a resistance weld 18a, and the first outer sheet 12 is joined to singly-apexed projections 14a of the inner sheet 14 via projection welds 18b. Merely be way of an environment of utilization, FIG. 1A shows an assembly 10' consisting of a roof panel 12' serving as the first outer sheet, which is to be welded to a body panel 14' serving as the inner sheet, and a strap spacer 16' serving as the second outer sheet, which is to be welded to the body panel opposite the roof.

Details of the two-sided, two step joining method of the prior art will be discussed with reference additionally to FIGS. 2A through 2F.

At FIG. 2A, a die 20 having interfacing die components 20a, 20b, wherein complementing v-shaped die faces 20a', 20b' are diametrically opposed to each other, is utilized to apply stamping forces $F_1'$ upon the inner sheet 14 to thereby form at least one pair of singly-apexed projections 14a, each being in the configuration of a general v-shape, in the inner sheet. By way of example, the resulting stamped inner sheet 14, as shown at FIGS. 2B through 2D, may have elongated singly-apexed projections 14a having a raised height H' of about 0.7 mm, a width W' of about 1.5 mm and a length L' of about 8 mm.

The first welding step of the prior art is depicted at FIG. 2E. The second outer sheet 16 is brought into abutment with the inner sheet 14, wherein the singly-apexed projections 14a face away from the second outer sheet. Diametrically aligned electrodes 24a, 24b of a resistance welding apparatus 24 are bought into abutment with opposing sides of the second outer sheet 16 and the inner sheet 14 between the singly-apexed projections. With opposing forces $F''_2$ being applied to the electrodes toward the first and second outer sheets, current is supplied to the electrodes, resulting in a resistance weld 18a.

The second welding step of the prior art is depicted at FIG. 2F. The first outer sheet 12 is brought into abutment with the singly-apexed projections 14a of the inner sheet 14, which has been already welded to the second outer sheet 16 via the first welding step. Welding electrodes 28a, 28b, one for each singly-apexed projection 14a, of a projection welding apparatus 28 are brought into abutment with the first outer sheet with applied forces $F_3'$ theretoward, wherein each electrode superposes a respective singly-apexed projection. Current i' is supplied to the electrodes, wherein the current passes through the abutting interface of the first outer sheet and the singly-apexed projections into the second outer sheet, and passes through the first outer sheet 12 as a current $i_1'$, through the inner sheet 14 as a current $i_2'$, and through the second outer sheet as a current $i_3'$ which, because the second outer sheet is much thicker than that of the first outer sheet and the inner sheet, it carries most of the current between the electrodes, resulting in the projection welds 18b.

The result of the prior art first and second welding steps is shown at FIG. 1. Any number of sets of welds 18a, 18b may be provided as between the sheets 12, 14, 16 in the manner above recounted for each set of singly-apexed projections.

While the two-sided, two step method of joining three sheets to each other works well, it has a number of disadvantages, mainly because it inherently requires multiple steps, and opposing sheet sides must be accessible to the welding electrodes (at least for the resistance welding step). Under the prior art joining methodology, neither of the two welding steps is capable of simultaneously welding all three sheets; for example, the large surface contact between the second outer sheet and the inner sheet precludes the second welding step from accomplishing this feat.

Therefore, what remains needed in the art is a joining methodology for three metal sheets which may somehow be performed with only one sheet side accessibility, and, further, be somehow performed using only a single welding step.

SUMMARY OF THE INVENTION

The present invention is a joining methodology for a stack of three metal sheets performed using only a single welding step, with access to only one sheet side being required.

In a first step, a metal sheet, which sheet is to become the inner sheet of the joined sheet stack, is subjected to a die stamping operation, wherein at least one pair of bifurcated projections are provided therein. Each bifurcated projection includes at least two apices, wherein at least one apex faces in one direction and at least another apex faces in the opposite direction. In this regard, it is preferred, for symmetry and stability, that the bifurcated projection to be in the form of a general w-shape, composed of two same facing outer apices which are disposed on either side of a central apex which faces oppositely to the outer apices.

In a second step, first and second outer metal sheets of the sheet stack are assembled with the inner sheet. In this regard, the first outer sheet is located so as to abut the central apex of each bifurcated projection, and the second outer sheet is located so as to abut the outer apices of each bifurcated projection.

In a third step, which may coincide with the above recounted second step, the sheet stack assembly is placed into a projection welding apparatus, wherein the electrodes thereof abut the first outer sheet such that each electrode is superposed a respective bifurcated projection.

In a fourth step, while force is applied to the electrodes toward the sheet stack assembly, current is supplied by the projection welding apparatus to the electrodes, whereupon current flows between a pair of the electrodes by conducting through the apices of each bifurcated projection and through the first outer sheet, the inner sheet, and the second outer sheet, wherein because of a much higher electrical conductivity of the second outer sheet in relation to the electrical conductivity of the first outer sheet and the inner sheet, most of the current flows through the second outer sheet. The much higher conductivity of the second outer sheet may be because the second outer sheet is much thicker than that of either of the first outer sheet and the inner sheet and/or because of selection of different metals of the sheets, such that the second outer sheet has a much lower resistivity to the electrical current.

Given the total current flowing between the electrodes is i, and if the current through the first outer sheet is $i_1$, the current through the inner sheet is $i_2$, and the current through the second outer sheet is $i_3$, then the total current, i, is given by: $i=i_1+i_2+i_3$, and $i_3>>(i_1+i_2)$ because of the much larger conductivity of the second outer sheets, as for example because of it having a very large cross-sectional area in relation to the cross-sectional areas of the first outer sheet and the inner sheet in the area between the electrodes (i.e., because it is in the form of a strap). Additional pairs of bifurcated projections may be similarly welded.

Accordingly, it is an object of the present invention to provide a joining operation for three metal sheets performed using only a single welding step, with access to only one sheet side being required.

This and additional objects, features and advantages of the present invention will become clearer from the following specification of a preferred embodiment.

BRIEF DESCRIPTION OF THE DRAWINGS

FIG. 4 is a perspective view of a sheet stack assembly being located in a projection welding apparatus according to the method of the present invention.

FIG. 5 is a partly sectional view seen along line 5-5 of FIG. 4.

FIG. 6 is a partly sectional view seen along line 6-6 in FIG. 4.

FIG. 7A is an end sectional view of a metal sheet stack joined according to the method of the present invention.

FIG. 7B is a side sectional view of the metal sheet stack joined according to the method of the present invention.

DESCRIPTION OF THE PREFERRED EMBODIMENT

Figure 1:
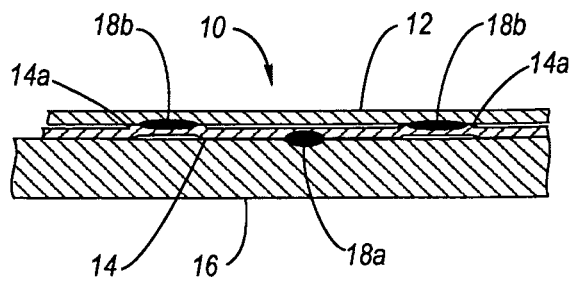
FIG. 1 is a sectional side view of a three metal sheet stack joined together using a welding technique of the prior art.

Referring now to the Drawing, FIGS. 3 through 7B depict an exemplification of the method according to the present invention for providing a joined metal sheet stack 100 (depicted at FIGS. 7A and 7B) formed of a metal sheet stack assembly 100' (see FIGS. 4, 5 and 6), wherein only one side of the sheet stack need be accessible to the welding apparatus and the welding of all the sheets of the sheet stack is simultaneously performed in a single step.

Figure 3:
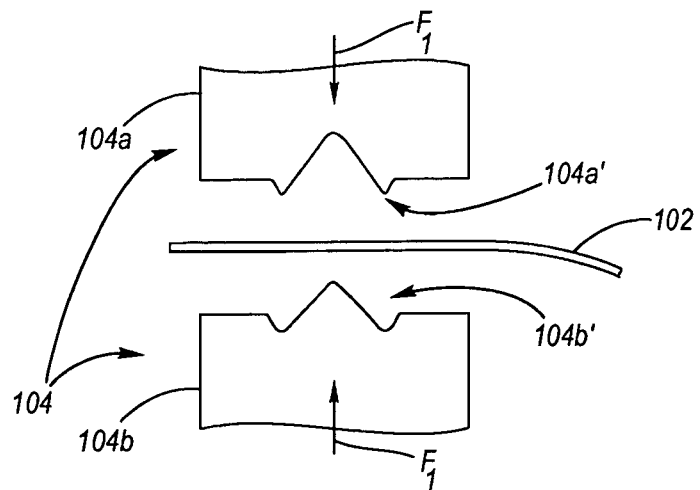
FIG. 3 is a partly sectional side view of a metal stamping operation according to the sheet stack joining method of the present invention.
Figure 3A:
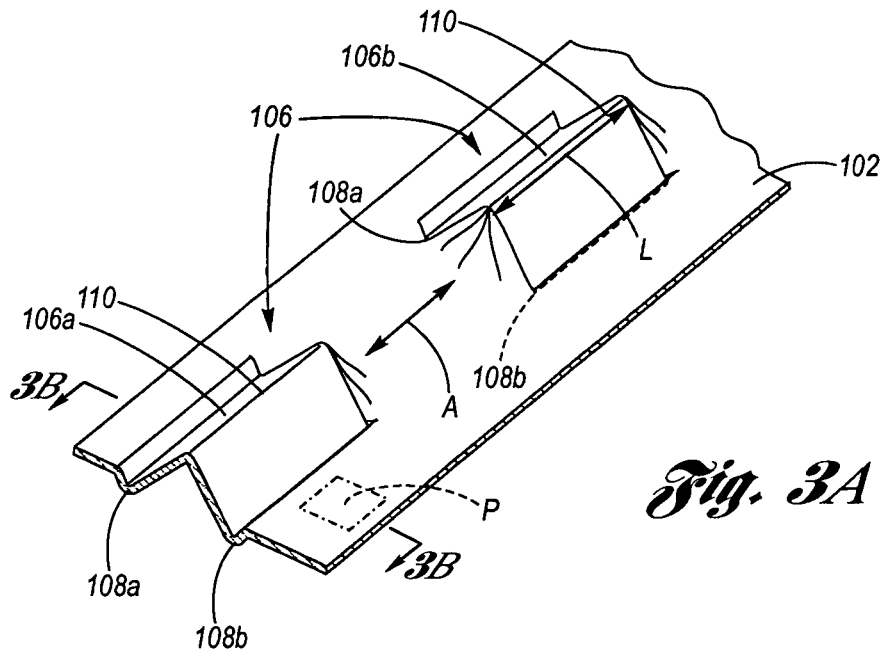
FIG. 3A is a perspective view of an inner sheet of a sheet stack assembly provided with a bifurcated projection according to the method of the present invention at FIG. 3.
Figure 3B:
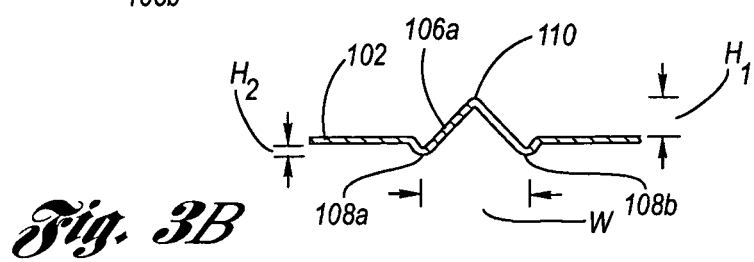
FIG. 3B is a sectional view seen along line 3B-3B of FIG. 3A.

FIGS. 3 through 3B depict an example of a first step of the joining method according to the present invention. A metal sheet, which sheet is to become the inner sheet 102 of the sheet stack assembly 100', is subjected to a die stamping operation, shown at FIG. 3. The die 104 has upper and lower interfacing die components 104a, 104b, wherein complementing bifurcated faces 104a' 104b' are diametrically opposed to each other. When the die 104 performs its stamping operation by applying opposed forces $F_1$ to the inner sheet 102, at least one bifurcated projection pair 106, composed of bifurcated projections 106a, 106b, is thereby formed in the inner sheet 102. Additional pairs of bifurcated projections may also be provided at the same time, or may be provided by subsequent stamping operations on the inner sheet.

Each bifurcated projection 106a, 106b is elongated in the axial alignment direction A therebetween, and includes at least two apices, wherein at least one apex (i.e., either or both of apices 108a, 108b) faces in one direction and at least another apex (i.e., apex 110) faces in the opposite direction. In this regard, it is preferred, for symmetry and stability, that each bifurcated projection 106a, 106b be in the form of a general w-shape, composed of two same facing outer apices 108a, 108b which are disposed on either side of a central apex 110 which faces oppositely to the outer apices. It is preferred for the central apex 110 to have a greater height $H_1$ in relation to the sheet plane P than the height $H_2$ of the outer apices 108a, 108b.

While the depiction of the bifurcated projections 106a, 106b may be exaggerated for visualization purposes in the drawings, by way merely of exemplary exposition, and not limitation, the following dimensions may be utilized: the length L of the elongation may be about 8 mm, the height $H_1$ of the central apex may be 0.6 mm, the height $H_2$ may be about 0.3 mm and the width W between the outer apices about outer apices may be between about 1.2 and 1.5 mm.

Turning attention next to FIGS. 4, 5 and 6, in a second step according to the joining method of the present invention, the metal sheet stack assembly 100' is provided, including the inner sheet 102, a metal first outer sheet 112 and a metal second outer sheet 114. In this regard, the first outer sheet 112 is located so as to abut the central apex 110 of each bifurcated projection 106a, 106b, and the second outer sheet 114 is located so as to abut the outer apices 108a, 108b of each bifurcated projection. The second outer sheet 114 is, according to a preferred aspect of the present invention, much thicker in comparison to each of the first outer sheet 112 and the inner sheet 102.

Figure 1A:
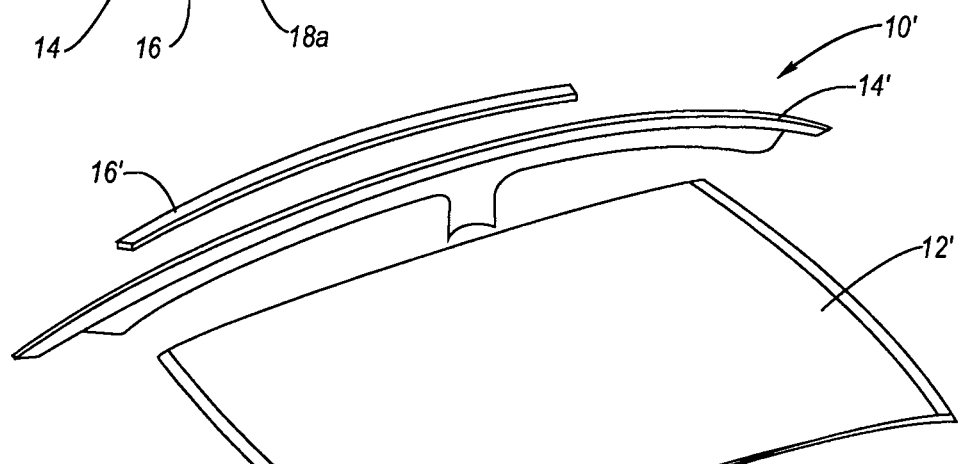
FIG. 1A is an exemplification of an environment of application of joining for a three sheet stack as is known in the prior art.
Figure 2A:
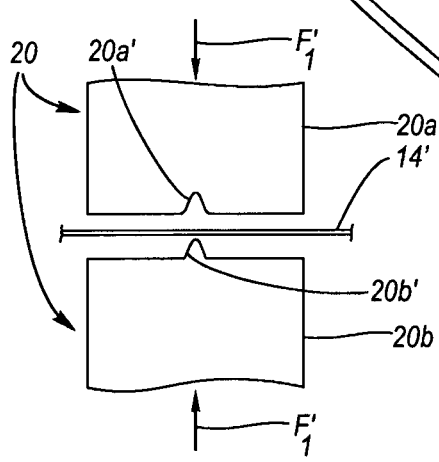
FIG. 2A is a partly sectional side view of a metal stamping operation according to the sheet stack joining method of the prior art.
Figure 2B:
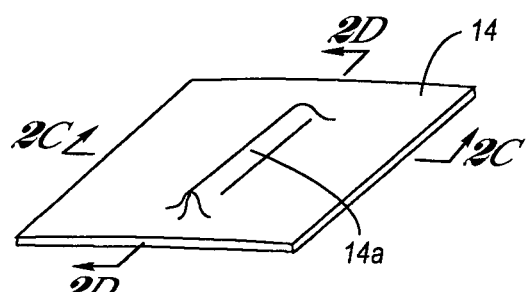
FIG. 2B is a perspective view of an inner sheet of a sheet stack provided with a singly-apexed projection according to the prior art method of FIG. 2A.
Figure 2C:
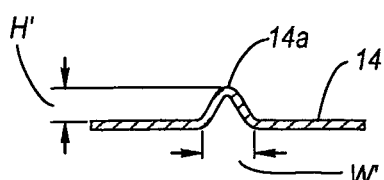
FIG. 2C is a sectional view seen along line 2C-2C of FIG. 2B.
Figure 2D:
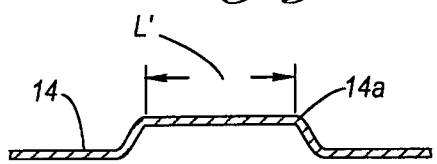
FIG. 2D is a sectional view seen along line 2D-2D of FIG. 2B.
Figure 2E:
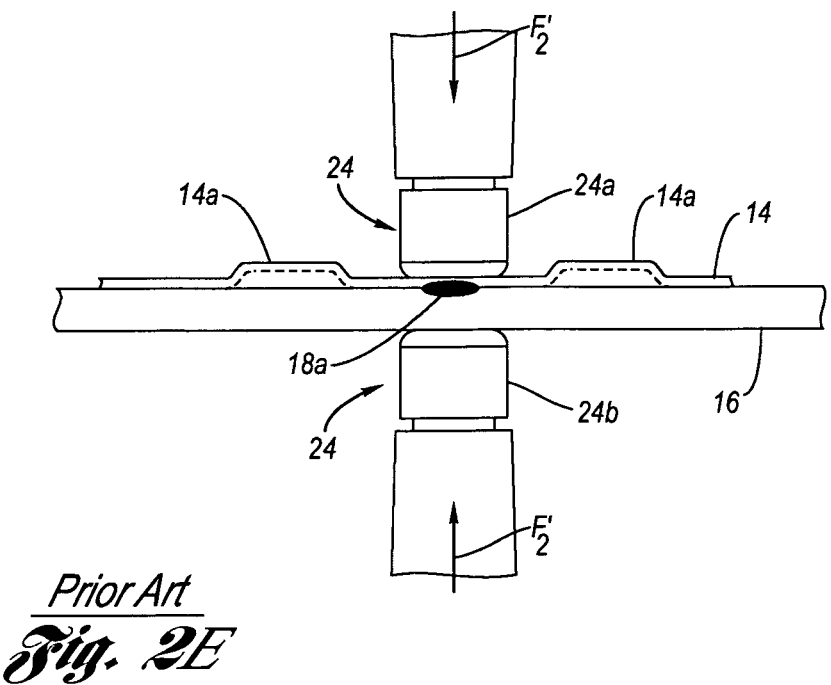
FIG. 2E is a side view of a first welding step according to the sheet stack joining method of the prior art.
Figure 2F:
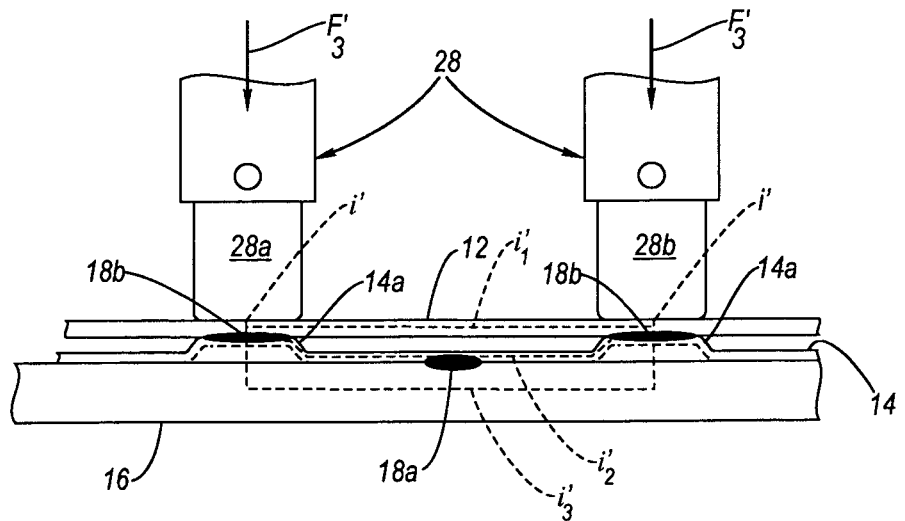
FIG. 2F is a side view of a second welding step according to the sheet stack joining method of the prior art.

Merely by way of nonlimiting exemplification of an environment of use of the method according to the present invention with respect to FIG. 1A, the first outer sheet 112 may be a roof, the second outer sheet may be a strap spacer, and the inner sheet 102 may be a body panel. Other nonlimiting examples of applications of the present invention may include door, hood, decklid, windshield, hinge, latch or other locations in which panels and a reinforcement are involved.

In a third step (which may be combined with the second step) of the joining method according to the present invention, shown at FIG. 4, the sheet stack assembly 100' is placed into a projection welding apparatus 120, wherein the electrodes 122a, 122b thereof abut the first outer sheet 112 such that each electrode is superposed a respective bifurcated projection 106a, 106b.

In a fourth step, shown at FIGS. 5 and 6, force $F_2$ is applied by the electrodes 122a, 122b toward the sheet stack assembly 100', and a current i is then supplied by a power supply 124 of the projection welding apparatus 120 to the electrodes while the force remains applied. The current i thereupon flows between the pair of the electrodes 122a, 122b by conducting through the apices 108a, 108b, 110 of each bifurcated projection 106a, 106b and through the first outer sheet 112, the inner sheet 102 and the second outer sheet 114, wherein because of the much larger electrical conductivity of the second outer sheet, most of the current flows therealong, a much smaller amount of the current flowing along either of the first outer sheet and the inner sheet. The much higher conductivity of the second outer sheet may be because the second outer sheet is much thicker than that of either of the first outer sheet and the inner sheet (i.e., because it is in the form of a strap spacer or other reinforcement) and/or because of selection of different metals of the sheets, such that the second outer sheet has a much lower resistivity to the electrical current.

As shown at FIG. 5, if the current through the first outer sheet 112 is $i_1$, the current through the inner sheet 102 is $i_2$, and the current through the second outer sheet 114 is $i_3$, then the total current, i, is given by:

$$i = i_1 + i_2 + i_3, \text{ where } i_3 \gg (i_1 + i_2) \qquad (1)$$

because, for preferred example, of the very large cross-sectional area of the second outer sheet 114 in relation to the cross-sectional areas of the first outer sheet 112 and the inner sheet 102 in the current conduction area between the electrodes 122a, 122b. Additional pairs of bifurcated projections are similarly welded.

During the single welding step of the present invention performed from only the first outer sheet side of the sheet stack assembly 100', the force $F_2$ is provided to the electrodes 122a, 122b then the current i is supplied while the force continues to be provided. The heating caused by the current combined with the force $F_2$ (for nonlimiting example each electrode may supply about 200 pounds (i.e., 400 pounds collectively)) results in collapse of the bifurcated projections 106a, 106b, particularly due to the contraction of the central apex 110 and outer apices 108a, 108b to the general final form of the joined sheet stack 100 of FIGS. 7A and 7B. It will be seen that a central weld 126 and outer welds 128a, 128b are disposed at the now collapsed bifurcated projections 106a', 106b', in particular at where were disposed formerly the central apex 110 and outer apices 108a, 108b, whereby the first and second outer sheets 112, 114 and the inner sheet 102 are mutually joined (indeed fused) together at the three welds 126, 128a, 128b, all having been performed in a single welding step with electrode access from only one side of the sheet stack assembly.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A method for joining a sheet stack assembly via a single welding step, comprising the steps of:
    selecting a first outer sheet structurally having a first electrical conductivity;
    selecting an inner sheet structurally having a second electrical conductivity;
    selecting a second outer sheet structurally having a third electrical conductivity;
    forming a pair of elongated bifurcated projections in the inner sheet, wherein each bifurcated projection comprises:
        forming a central apex facing in a first direction; and
        forming a pair of outer apices facing in a second direction opposite the first direction, one outer apex respectively disposed at each side of the central apex;
    assembling a sheet stack assembly comprising the steps of:
        placing the first outer sheet in abutting relation to the central apex of the inner sheet; and
        placing the second outer sheet in abutting relation to the outer apices of the inner sheet; and
    joining the sheet stack assembly together, comprising the steps of:
        applying force toward the first outer sheet, the force being superposed each bifurcated projection;
        abutting a pair of electrodes of a source of electrical current to only the first outer sheet during said step of applying force, wherein each electrode of said pair of electrodes is superposed a respective bifurcated projection; and
        welding the sheet stack assembly joinably together in a singular welding step by delivering electrical current from the source of electrical current to the pair of electrodes;
    wherein the third electrical conductivity is much higher than the first and second electrical conductivities such that if the electrical current through the first outer sheet is $i_1$, the electrical current through the inner sheet is $i_2$, and the electrical current through the second outer sheet is $i_3$, then the total electrical current, i, is given by: $i = i_1 + i_2 + i_3$, where $i_3 \gg (i_1 + i_2)$; and
    wherein during said step of welding, the electrical current flows between the pair of electrodes by conducting through the first outer sheet, through the apices of each bifurcated projection of the inner sheet, and through the second outer sheet, wherein due to the third electrical conductivity in relation to the first and second electrical conductivities in combination with the abutment of the pair of electrodes to only the first outer sheet, most of the electrical current flows through the second outer sheet such that the sheet stack assembly is welded together.

2. The method of claim 1, wherein in said step of forming, the central apex has a height greater than a height of the outer apices in relation to a plane of the inner sheet.

3. A joined sheet stack joined according to the method of claim 2.

4. The method of claim 1, wherein said step of welding further comprises placing the sheet stack assembly into a projection welding apparatus.

5. A joined sheet stack joined according to the method of claim 1.

* * * * *